(No Model.)
L. L. CUTLER.
FLUID PRESSURE GOVERNOR.
No. 529,111. Patented Nov. 13, 1894.
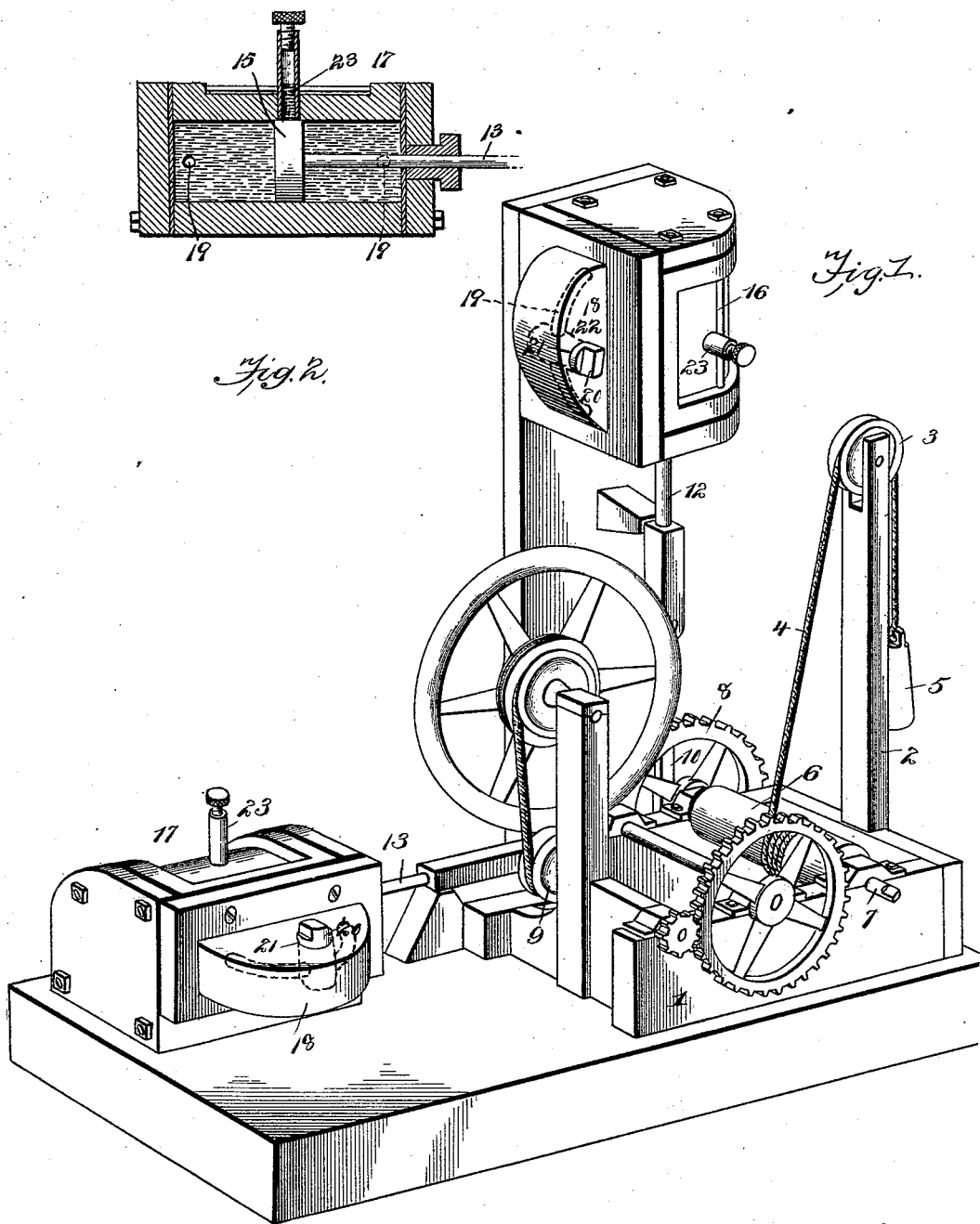
Witnesses
Inventor
Lorrain L. Cutler
By his Attorneys.

UNITED STATES PATENT OFFICE.

LORRAIN LUTELLUS CUTLER, OF GOODLAND, INDIANA, ASSIGNOR OF ONE-FOURTH TO SIGEL A. ROYSTER, OF SAME PLACE.

FLUID-PRESSURE GOVERNOR.

SPECIFICATION forming part of Letters Patent No. 529,111, dated November 13, 1894.

Application filed September 30, 1893. Serial No. 486,888. (No model.)

*To all whom it may concern:*

Be it known that I, LORRAIN LUTELLUS CUTLER, a citizen of the United States, residing at Goodland, in the county of Newton and State of Indiana, have invented a new and useful Improvement in Fluid-Pressure Governors, of which the following is a specification.

My invention relates to an improvement in governing mechanism for weight motors; and it consists in cylinders filled with a fluid and having their opposite ends connected by means of passages through which the liquid is forced back and forth by means of pistons which operate in the cylinders, and a small chamber connected with each cylinder in which air is compressed, all of which will be more fully described hereinafter.

The object of my invention is to provide each cylinder with an expansion chamber that is filled with compressed air, and into which the fluid in the cylinder expands during warm weather, and which supplies air to the cylinder during cold weather when the fluid has contracted, and thus prevents a vacuum from being formed and causing an even regular motion to the operating parts.

In the accompanying drawings:—Figure 1 is a perspective view showing my invention applied to the fluid governor of a weight motor. Fig. 2 is a horizontal section of one of the cylinders.

1 represents a frame having a standard 2 and provided at its top with a pulley 3 over which passes a rope or cable 4 which has one end attached to and carrying a weight 5, and which has its other end secured to a drum 6 of a winding shaft 7. The rope or cable is wound upon the drum to raise the weight in order that it may in descending rotate the winding shaft 7 which is connected by a suitable clutch with a crank wheel 8. The crank wheel 8 is a gear wheel, and is connected by suitable gearing with a drive wheel 9, from which may be run a belt for driving or operating any suitable light machinery.

The crank wheel is connected by pitmen 10 and 11 with piston rods 12 and 13 of pistons 14 and 15 which operate in the cylinders 16 and 17. These two cylinders are placed at right angles to each other and they contain a suitable fluid such as heavy oil for retarding the reciprocation of the pistons. Each cylinder is provided with an extension 18 of its casing, which extension is provided with a passage 19 having its ends terminating at the ends of the cylinder, so as to cause the oil or other fluid to circulate and to be forced by the piston from one end of the cylinder to the other. The circulation of the oil or other fluid is regulated by a cock or valve 20, which is mounted in an opening 21 of the extension 18. By turning this cock the speed of the falling weight is controlled.

Two cylinders are preferably used and they are so arranged with relation to each other that when one piston is at the end of a stroke the other has started and is subjected to the full resistance of the oil or other fluid.

Each cylinder is provided with a chamber 23 into which air is compressed to any suitable degree, and which chamber serves to allow the fluid to expand into it during warm weather, and to supply air to the cylinder during cold weather when the fluid has contracted, and thus prevent a vacuum from being formed. If the fluid expands the cylinder is liable to be injured or leakage take place, and if the fluid contracts a vacuum will be formed in the cylinder, and all regularity of action destroyed. Where oil or water is used in the cylinders these chambers 23 are absolutely necessary to automatically regulate the expansion and contraction.

Having thus described my invention, I claim—

In a governor mechanism, the combination of a drive wheel, of fluid containing resistance cylinders placed at an angle to each other, valve controlling ducts or channels connecting opposite ends of each of said cylinders, pistons fitting in the cylinders, pitmen connecting the piston rods to a common crank pin on the drive wheel, and tubular chambers 23 communicating with the interior of the cylinders, said chambers being partially filled by the fluid in the cylinders, the remaining part of the chambers holding compressed air, substantially as specified.

In testimony that I claim the foregoing as my own I have hereto affixed my signature in the presence of two witnesses.

LORRAIN LUTELLUS CUTLER.

Witnesses:
CHAS. HUMSTON,
STEPHEN BRINGHAM.